(12) United States Patent
Chevli et al.

(10) Patent No.: US 9,085,707 B2
(45) Date of Patent: Jul. 21, 2015

(54) AQUEOUS PIGMENT DISPERSIONS AND INKJET INKS

(71) Applicant: E I DU PONT DE NEMOURS AND COMPANY, Wilmington, DE (US)

(72) Inventors: Samit N Chevli, Hockessin (DE); Xiaoqing Li, Newark, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 75 days.

(21) Appl. No.: 13/833,087

(22) Filed: Mar. 15, 2013

(65) Prior Publication Data

US 2014/0061544 A1     Mar. 6, 2014

Related U.S. Application Data

(60) Provisional application No. 61/695,567, filed on Aug. 31, 2012.

(51) Int. Cl.
  *C09D 11/326* (2014.01)
  *C09D 11/38* (2014.01)

(52) U.S. Cl.
  CPC .............. *C09D 11/38* (2013.01); *C09D 11/326* (2013.01)

(58) Field of Classification Search
  CPC .............................. C09D 11/326; C09D 11/38
  USPC .............................. 106/31.43, 31.75, 499, 505
  See application file for complete search history.

(56) References Cited

U.S. PATENT DOCUMENTS

| | | | |
|---|---|---|---|
| 4,597,794 A | 7/1986 | Ohta et al. | |
| 5,022,592 A | 6/1991 | Zakheim et al. | |
| 5,026,427 A | 6/1991 | Mitchell et al. | |
| 5,085,698 A | 2/1992 | Ma et al. | |
| 5,231,131 A | 7/1993 | Chu et al. | |
| 5,679,138 A | 10/1997 | Bishop et al. | |
| 5,891,231 A | 4/1999 | Guerlich et al. | |
| 5,976,232 A | 11/1999 | Gore | |
| 6,033,463 A * | 3/2000 | Yui et al. | 106/31.27 |
| 6,039,793 A * | 3/2000 | Gundlach et al. | 106/31.75 |
| 6,117,921 A | 9/2000 | Ma et al. | |
| 6,262,152 B1 | 7/2001 | Fryd et al. | |
| 6,306,994 B1 | 10/2001 | Donald et al. | |
| 6,433,117 B1 | 8/2002 | Ma et al. | |
| 7,211,130 B1 * | 5/2007 | Chevli | 106/31.27 |
| 7,223,300 B2 * | 5/2007 | Chevli | 106/31.27 |
| 7,370,952 B2 * | 5/2008 | Inoue et al. | 347/100 |
| 7,442,243 B2 * | 10/2008 | Chevli | 106/31.37 |
| 8,186,822 B2 * | 5/2012 | Li et al. | 347/100 |
| 8,759,418 B2 * | 6/2014 | Li et al. | 523/160 |
| 8,946,320 B2 * | 2/2015 | Guo et al. | 523/160 |
| 2003/0089277 A1 | 5/2003 | Zakheim et al. | |
| 2004/0186200 A1 * | 9/2004 | Yatake | 106/31.75 |
| 2007/0259989 A1 * | 11/2007 | Berge et al. | 523/160 |
| 2008/0108736 A1 * | 5/2008 | Tsukada | 524/190 |
| 2008/0254228 A1 * | 10/2008 | Kojima et al. | 427/466 |
| 2013/0278671 A1 * | 10/2013 | Ishihara et al. | 347/20 |

FOREIGN PATENT DOCUMENTS

| | | |
|---|---|---|
| EP | 0556649 A1 | 8/1993 |
| WO | WO 2009/137747 A1 * | 11/2009 |
| WO | WO 2009/143441 A1 * | 11/2009 |

OTHER PUBLICATIONS

H. Spinelli, in Advanced Matter, 1998, vol. 10, No. 15, pp. 1215 to 1218.

* cited by examiner

*Primary Examiner* — Helene Klemanski
(74) *Attorney, Agent, or Firm* — Simon L. Xu

(57) ABSTRACT

The present disclosure pertains to an aqueous pigment dispersion containing a pigment as colorant, a polymeric dispersant and a hydroxyl-substituted amino acid. The present disclosure further pertains to an ink containing an aqueous vehicle and the aqueous pigment dispersion, and ink sets with at least one of the inks containing the pigment dispersion.

20 Claims, No Drawings

AQUEOUS PIGMENT DISPERSIONS AND INKJET INKS

CROSS REFERENCE TO RELATED APPLICATIONS

This application claims priority under 35 U.S.C. §119 from U.S. Provisional Application Ser. No. 61/695,567, filed Aug. 31, 2012, which is incorporated by reference in its entirety.

BACKGROUND OF THE DISCLOSURE

The present disclosure pertains to an aqueous pigment dispersion containing a hydroxyl-substituted amino acid, a dispersant, and a pigment colorant. The present disclosure further pertains to an ink and an ink set containing the aqueous pigment dispersion, and printing of said ink on a variety of substrates, particularly nonporous media.

Digital printing methods such as inkjet printing are becoming increasingly important for markets other than conventional desktop printing for small office/home office. The desktop printing market category is based upon the use of inks that have been optimized primarily for printing documents and photographs. Commercial printing applications range from printing wide format posters, banners, and billboards, to product coding on cans and bottles. For this disclosure, printing of wide format graphics is considered as commercial printing. Industrial printing applications include direct mail, addressing, product coding, and marking. High speed, page wide array industrial inkjet-based printers are also used to print magazines and newspapers, etc. In addition, a new field in commercial printing is printing of books on demand in a bookstore setting.

The inks used in commercial/industrial applications often have different requirements. For conventional desktop printing, print droplets must be tightly controlled. Additionally, desktop printers print on limited types of substrates. For commercial and industrial printers, a high premium is place on being able to print on a wide range of substrates. Industrial inkjet printing is an established and expanding market. Inkjet printers are widely used to place images on mail and business forms, on primary and secondary packaging. Also, the time for the printed image to dry is much more important for commercial/industrial printing.

The substrates for commercial/industrial printing range from porous substrate like newspaper media, uncoated bond papers used to print books and transpromotional material to nonporous media used to print magazines and marketing literature. Furthermore, home/office paper may be printed as well.

Ink viscosity is a critical attribute for an ink impacting the ink's jetting reliability. Additives are known to be included in an ink to modestly change its viscosity to satisfy requirements for printheads and other printing factors. Such ink viscosity additives should not affect other ink properties such as conductivity and stability. A need exists for new viscosity modifiers with improved properties. These viscosity modifiers may be added during preparation of aqueous pigment dispersions prior to formulation of inks. A need also exists for highly stable, higher-quality and different property inks for ink-jet applications.

SUMMARY OF THE DISCLOSURE

An embodiment provides an aqueous pigment dispersion comprising a colorant and a hydroxyl-substituted amino acid or salt thereof; wherein said colorant is dispersed with a polymeric dispersant, and said hydroxy-substituted amino acid has a structure of Formula I,

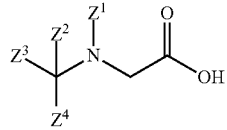
(I)

$Z^1$ is H or $(CH_2)_k OH$; k is 1-6;
$Z^2$ is $(CH_2)_m OH$; m is 1-5;
$Z^3$ is H or $(CH_2)_n OH$; n is 1-5;
$Z^4$ is H or $(CH_2)_p OH$; p is 1-5; and
wherein there are at least two hydroxyl alkyl substitutents on said amino acid.

Another embodiment provides that the amount of the hydroxy-substituted amino acid is 0.01 to 2.0 weight percent of the aqueous pigment dispersion.

Another embodiment provides that the amount of the hydroxy-substituted amino acid is 0.02 to 1.0 weight percent of the aqueous pigment dispersion.

Another embodiment provides that the hydroxyl-substituted amino acid is bicine which corresponds to Structure (I), wherein $Z^1$ and $Z^2$ are $(CH_2)_2 OH$, and $Z^3$ and $Z^4$ are H.

Another embodiment provides that the hydroxyl-substituted amino acid is tricine which corresponds to Structure (I), wherein $Z^1$ is H, and $Z^2$, $Z^3$ and $Z^4$ are $(CH_2)OH$.

Another embodiment provides that the colorant is selected from the group consisting of pigments, disperse dyes and mixtures thereof.

Another embodiment provides that the polymeric dispersant is selected from the group consisting of acrylic dispersant comprising acrylic and acrylate monomers, polyurethane dispersant, and mixtures thereof.

Another embodiment provides that the amount of the pigment is from 5 to 30 weight percent of said aqueous pigment dispersion.

Another embodiment provides that the dispersion has a viscosity that is less than the viscosity of a similar aqueous pigment dispersion without any hydroxyl-substituted amino acid.

Another embodiment provides that the pH of said aqueous pigment dispersion is from 6 to 9.

Another embodiment provides an inkjet ink comprising an aqueous vehicle, an aqueous pigment dispersion comprising a colorant and a hydroxyl-substituted amino acid or salt thereof; wherein said colorant is dispersed with a polymeric dispersant, and said hydroxyl-substituted amino acid has a structure of Formula I,

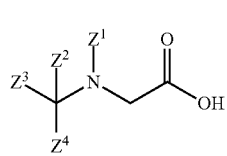
(I)

$Z^1$ is H or $(CH_2)_k OH$; k is 1-6;
$Z^2$ is $(CH_2)_m OH$; m is 1-5;
$Z^3$ is H or $(CH_2)_n OH$; n is 1-5;
$Z^4$ is H or $(CH_2)_p OH$; p is 1-5; and wherein there are at least two hydroxyl alkyl substitutents on said amino acid.

Another embodiment provides that the polymeric dispersant is substituted with crosslinkable moieties selected from the group consisting of acetoacetoxy, acid, amine, epoxy, hydroxyl, blocked isocyanates and mixtures thereof.

Another embodiment provides that the polymeric dispersant substituted with crosslinkable moieties is reacted with a crosslinking agent selected from the group consisting of acetoacetoxy, acid, amine, anhydride, epoxy, hydroxyl, isocyanates, blocked isocyanates and mixtures thereof.

Another embodiment provides that an inkjet ink set comprises at least three differently colored inks, at least one of which comprises at least one aqueous pigment dispersion as set forth above.

Another embodiment provides that the ink set comprises at least three differently colored inks, at least one of which is a yellow ink, at least one of which is a magenta ink, and at least one of which is a cyan ink.

Another embodiment provides that the ink set further comprises a black ink.

These and other features and advantages of the present embodiments will be more readily understood by those of ordinary skill in the art from a reading of the following Detailed Description. Certain features of the disclosed embodiments which are, for clarity, described above and below as separate embodiments, may also be provided in combination in a single embodiment. Conversely, various features of the disclosed embodiments that are described in the context of a single embodiment, may also be provided separately or in any subcombination.

DETAILED DESCRIPTION

Unless otherwise stated or defined, all technical and scientific terms used herein have commonly understood meanings by one of ordinary skill in the art to which this disclosure pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples encompassed by the terms "consisting essentially of" and "consisting of." Similarly, the term "consisting essentially of" is intended to include examples encompassed by the term "consisting of."

As used herein, the term "hydroxyl-substituted amino acid" means an amino acid containing one or more hydroxyl substituents on either the nitrogen atom directly or via one or more alkyl groups connected to the nitrogen atom of the amino acid. The term "hydroxyl-substituted amino acid" is also referred to as hydroxyl alkyl substituted amino acid.

As used herein, the term "dispersion" means a two phase system where one phase consists of finely divided particles (often in the colloidal size range) distributed throughout a bulk substance, the particles being the dispersed or internal phase and the bulk substance the continuous or external phase. The bulk system is often an aqueous system.

As used herein, the term "dispersion of pigment particles" is a stable dispersion of polymeric dispersed pigments which are normally used in inks and paints.

As used herein, the term "aqueous pigment dispersion" is an aqueous dispersion of pigments using polymeric dispersants.

As used herein, the term "dispersant" means a surface active agent added to a suspending medium to promote uniform and maximum separation of extremely fine solid particles often of colloidal size. For pigments, the dispersants are most often polymeric dispersants and the dispersants and pigments are combined using dispersing equipment.

As used herein, the term "structured polymer" means a polymer that is composed of segments that differ in composition from each other. Examples include diblock, triblock, graft and star polymers.

As used herein, the term "random polymer" means a polymer that is composed of monomers distributed in a random fashion in the polymer in much the same mole ratio of the monomers in the initial monomer composition.

As used herein, the term "dispersible particles" are those particles that can be dispersed with dispersants including polymeric dispersants.

As used herein, the term "stable dispersion" means a particle dispersion where the particle size growth is less than 10% particle size growth and no flocculation when the dispersion is stored at room temperature for at least a week.

As used herein, the term "pigment" means any substance usually in a powder form which imparts color to another substance or mixture. Disperse dyes, white and black pigments are included in this definition.

As used herein, the term "P/D" means the pigment to dispersant weight ratio in the initial dispersion formulation.

As used herein, the term "ambient conditions" refers to surrounding conditions, which are often around one atmosphere of pressure, about 50% relative humidity, and about 25° C.

As used herein, the term "crosslinking" means the chemical reaction between reactive groups on at least two different chemicals, where one of the chemicals is at least trisubstituted.

As used herein, the term "emulsion" means a stable mixture of two or more immiscible liquids held in suspension by small percentages of substances called emulsifiers.

As used herein, the term "nonionic" means an oligomer or polymer derived from ethylene oxide and/or propylene oxide where there are at least 4 of the ethylene oxide or propylene oxide groups, As used herein, the term "binder" means a film forming ingredient in the inkjet ink. This binder is normally added when the ink is formulated.

As used herein, the term "HSD" means High Speed Dispersing.

As used herein, the term "OD" means optical density.

As used herein, the term "Gloss" means observation of reflected light from a printed surface, normally the printed substrate is glossy paper.

As used herein, "smear resistance" refers to the resistance of an image to blurring when stroked with a highlighter marker As used herein, the term "SDP" means a self-dispersible, self-dispersing, or self-dispersed pigments.

As used herein, the term "aqueous vehicle" refers to water or a mixture of water and at least one water-soluble organic solvent (co-solvent).

As used herein, the term "ionizable groups", means potentially ionic groups.

As used herein, the term "substantially" means being of considerable degree, almost all.

As used herein, the term "Mn" means number average molecular weight usually reported in daltons.

As used herein, the term "Mw" means weight average molecular weight usually reported in daltons.

As used herein, the term "Pd" means the polydispersity which is the weight average molecular weight divided by the number average molecular weight.

As used herein, the term "D50" means the particle size at which 50% of the particles are smaller; "D95" means the particle size at which 95% of the particles are smaller.

As used herein, the term "cP" means centipoise, a viscosity unit.

As used herein, the term "conductivity" means the property of a substance or mixture that describes its ability to transfer electricity and is reported as mS/cm.

As used herein, the term "AN" means acid number, mg KOH/gram of solid polymer.

As used herein, the term "neutralizing agents" means to embrace all types of agents that are useful for converting ionizable groups to the more hydrophilic ionic (salt) groups.

As used herein, the term "PUD" means the polyurethane dispersions described herein.

As used herein, the term "GPC" means gel permeation chromatography.

As used herein, the term "THF" means tetrahydrofuran.

As used herein, the term "Tetraglyme" means tetraethylene glycol dimethyl ether.

As used herein, the term "Sulfolane" means tetramethylene sulfone.

As used herein, the term "DEA" means diethanolamine.

As used herein, the term "BMEA" means bis(methoxyethyl)amine.

As used herein, the term "Vazo® 68" refers to a free radical source for polymerization; the product is obtained from DuPont, Wilmington Del.

As used herein, the term "Liponics EG-1" refers to a humectant obtained from Lipo Chemicals, Paterson, N.J.

As used herein, Eternacoll® UH-50 is a polycarbonate diol from UBE Industries, Tokyo, Japan.

As used herein, the term "DBTDL" means dibutyltin dilaurate.

As used herein, Denacol® 321 is trimethylolpropane polyglycidyl ether, a crosslinking reagent from Nagase Chemicals Ltd., Osaka, Japan.

As used herein, the term "TMXDI" means m-tetramethylene xylylene diisocyanate.

As used herein, the term "PROXEL™ biocide" refers to a biocide obtained from Arch Chemicals, Norwalk, Conn.

As used herein, the term "Desmophen® 1200" refers to a hydroxyl bearing polyester carbonate obtained from Bayer Material Science, Pittsburgh, Pa.

Unless otherwise noted, the above chemicals were obtained from Aldrich (Milwaukee, Wis.) or other similar suppliers of laboratory chemicals.

Pigmented inkjet ink is formulated with pigment dispersion stabilized with water soluble or water dispersible polymer. Ink viscosity is a critical ink attribute impacting ink's jetting reliability. One of the limitations of formulating higher pigment loading ink is the viscosity of the pigment dispersion. Higher pigment loading usually results in higher ink viscosity which is too high to jet reliably. Higher pigment dispersion viscosity also adds more limitation on ink's vehicle formulation such as humectant level.

Many strategies were tested to reduce the viscosity of the pigment dispersion including removing as much free polymer as possible in the pigment aqueous solvent by ultrafiltration and other strategies. Pigment/Dispersion (PD) variation was attempted to control viscosity and that option was also not successful.

During experimentation of other candidate additives, it was found by adding a small amount of hydroxyl alkyl substituted amino acids to the polymerically dispersed pigment dispersion the dispersion viscosity could be reduced without significantly increasing conductivity.

Hydroxyl-Substituted Amino Acids

The hydroxyl-substituted amino acid has the following structure:

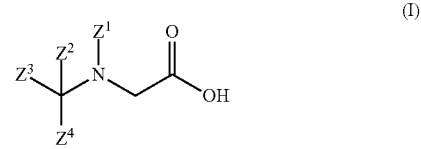

(I)

$Z^1$ is H or $(CH_2)_kOH$; k is 1-6;
$Z^2$ is $(CH_2)_mOH$; m is 1-5;
$Z^3$ is H or $(CH_2)_nOH$; n is 1-5;
$Z^4$ is H or $(CH_2)_pOH$; p is 1-5; and
wherein there are at least two hydroxyl alkyl substitutents on said amino acid. These hydroxyl-substituted amino acids are either commercially available or can be readily prepared by one of ordinary skill in the art using methods commonly known.

Pigments

Pigments suitable for used in the present disclosure are those generally well-known in the art for aqueous inkjet inks. Traditionally, pigments are stabilized by dispersing agents, such as polymeric dispersants or surfactants, to produce a stable dispersion of the pigment in the vehicle. Representative commercial dry pigments are listed in U.S. Pat. No. 5,085,698. Dispersed dyes are also considered pigments as they are insoluble in the aqueous inks used herein. More recently so-called "self-dispersible" or "self-dispersed" pigments (hereafter "SDP") have been developed. As the name would imply, SDPs are dispersible in water without dispersants.

Pigments which have been stabilized by polymeric dispersants may also have these dispersants crosslinked after the pigments are dispersed. An example of this crosslinking strategy is described in U.S. Pat. No. 6,262,152.

A wide variety of organic and inorganic pigments, alone or in combination, may be selected to make the ink. The term "pigment" as used herein means an insoluble colorant. The pigment particles are sufficiently small to permit free flow of the ink through the inkjet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculating. It is also desirable to use small particles for maximum color strength and gloss. The range of useful particle size is typically about 0.005 micron to about 15 micron. Preferably, the pigment particle size should range from about 0.005 to about 5 micron and, most preferably, from about 0.005 to about 1 micron. The average particle size as measured by dynamic light scattering is preferably less than about 500 nm, more preferably less than about 300 nm.

The polymerically dispersed pigments may have the polymeric dispersants crosslinked after the dispersion process is completed. In this case the pigment is thought to have its polymeric dispersants crosslinked to each other by the addition of crosslinked components. A type of this crosslinked is described in U.S. Pat. No. 6,262,152.

The selected pigment(s) may be used in dry or wet form. For example, pigments are usually manufactured in aqueous media and the resulting pigment is obtained as water-wet presscake. In presscake form, the pigment is not agglomerated to the extent that it is in dry form. Thus, pigments in water-wet presscake form do not require as much deflocculation in the process of preparing the inks as pigments in dry form.

Polymeric Dispersants

Polymeric dispersants are those typically used for dispersing pigments, especially when these pigments are used for inkjet inks. Examples of these dispersants include polyurethanes and acrylic/acrylate copolymers. The polymers may be random or structured. The polymeric dispersant has a number average molecular weight of 2000 to 9500 daltons.

The polymeric dispersant may be water soluble and may have a solubility of at least 10 grams of polymer/100 grams of water at 25° C. The solubility is measured in its neutralized form.

The polymeric dispersant for the pigment may be either a random or structured polymer.

Typical random polymeric dispersants have been described in U.S. Pat. No. 4,597,794.

The "structured polymer" can mean polymers having a block, branched, graft or star structure. Examples of structured polymers include AB or BAB block copolymers such as disclosed in U.S. Pat. No. 5,085,698; ABC block copolymers such as disclosed in EP Patent Specification No. 0556649; and graft polymers such as disclosed in U.S. Pat. No. 5,231,131. Other polymeric dispersants that can be used are described, for example, in U.S. Pat. No. 6,117,921, U.S. Pat. No. 6,262,152, U.S. Pat. No. 6,306,994 and U.S. Pat. No. 6,433,117.

The polymeric dispersant can be a copolymer of hydrophobic and hydrophilic monomers, such as acrylic polymers. Alternately, the polymeric dispersant may be a polyurethane.

Acrylic polymer dispersants suitable for use in the present disclosure generally comprise both hydrophobic and hydrophilic monomers. Some examples of hydrophobic monomers used in random polymers are methyl methacrylate, n-butyl methacrylate, 2-ethylhexyl methacrylate, benzyl methacrylate, 2-phenylethyl methacrylate and the corresponding acrylates. Examples of hydrophilic monomers are methacrylic acid, acrylic acid, dimethylaminoethyl(meth)acrylate and salts thereof. Also quaternary salts of dimethylaminoethyl (meth)acrylate may be employed.

Generally speaking the hydrophobic region is the part that contains the absorbing segment, which is the segment or function of the dispersant interacting with the pigment surface to effect dispersion. The hydrophilic segment is the segment that provides the stability of dispersion by interaction in the solute mixture to provide stabilization. This stabilization is characterized as steric stabilization or ionic stabilization. These phenomena were described by H. Spinelli in Adv. Mater, 1998, 10, no. 15, page 1215 to 1218. The ionically stabilized polymeric dispersants described above have little if any steric stabilization.

The polymeric dispersant can be neutralized prior to the start of the dispersion process. That is, the initial mixture of solvent blend and polymer dispersant has an appropriate amount of neutralizing agent. Alternatively, the neutralizing agent may be added with the polar solvent during the dispersing process. An additional option is to have the polymeric dispersant partially neutralized in the initial mixture and add additional neutralizing agent in the polar solvent. The amount of neutralization of the polymeric dispersant in the final mixture is up to about 100% neutralized, and preferably up to about 90% neutralized.

The neutralizing agent can be hydroxides of the alkali metals, amines and the like. Examples of neutralizing agents include organic bases such as mono-, di, tri-methylamine, morpholine, n-methyl morpholine; alcohol amines such as dimethylethanolamine (DMEA), methyldiethanolamine, mono-, di, and tri-ethanolamine; pyridine; ammonium hydroxide; tetra-alkylammonium salts such as tetramethylammonium hydroxide, tetraethyl-ammonium hydroxide; alkali metals such as lithium, sodium and potassium, and the like. Preferred neutralizing agents include dimethylethanolamine and sodium and potassium hydroxides, with potassium hydroxide being particularly preferred for inks to be used in thermal inkjet printers.

The polyurethane polymeric dispersants are prepared from isocyanate compounds, isocyanate-reactive compounds and an isocyanate or isocyanate reactive compound that has an ionic substituent. This ionic substituent is present in the polyurethane dispersant to stabilize it in an aqueous solution. Often these polyurethane dispersants are prepared as a polyurethane prepolymer with excess isocyanate groups. Then a chain terminating isocyanate-reactive group is added to obtain polyurethane dispersant. The ionic content of the polyurethane can be as low as 10 and as high as 90 milliequivalents/gram when measured as an acid group or an amine group depending on the source of the ionic substituent. The ionic component is at least partially neutralized prior to its use as a dispersant. The molecular weight range of these polyurethanes is from 2000 to 9500 daltons.

Dispersion of the Pigment Particles

The dispersing step for the polymerically dispersed pigment may be accomplished in an ultrasonicator, media mill, a horizontal mini mill, an attritor, or by passing the mixture through a plurality of nozzles within a liquid jet interaction chamber at a liquid pressure of at least 5,000 psi to produce a uniform dispersion of the pigment particles in the aqueous carrier medium (microfluidizer). The media for the media mill is chosen from commonly available media, including zirconia, YTZ, and nylon. The media can be as small as about 0.1 microns, although particles larger than 0.3 microns are commonly used. These various dispersion processes are in a general sense well known in the art, as exemplified by U.S. Pat. No. 5,022,592, U.S. Pat. No. 5,026,427, U.S. Pat. No. 5,891,231, U.S. Pat. No. 5,679,138, U.S. Pat. No. 5,976,232 and U.S. Patent Application Publication No. 20030089277. Preferred are media mill, and by-passing the mixture through a plurality of nozzles within a liquid jet interaction chamber at a liquid pressure of at least 5,000 psi. The mixing intensity required for the process is mixing normally associated with dispersion processes and not turbulent mixing of more modest mixing processes.

Combinations of dispersing equipment may be used. It may be more convenient to mix the solvent mixture, particle and polymeric dispersant in a High Speed Disperser (HSD) followed by milling in a media mill or a microfluidizer. The addition of the polar solvent may occur during the HSD portion of the processing and then the milling is continued in the media mill.

The final use of the particle dispersion may require that the solvent be removed from the particle dispersion mixture. The solvent may be removed by distillation processing, ultrafiltration or other convenient means. Any of these solvent removal methods may be incorporated into the process. The dispersing equipment and the solvent removal may be coupled and the solvent may be removed during the dispersing process and during the addition of the polar solvent.

One way to monitor the progress of the dispersion process is to measure the particle size and set a target value for the final D50 of the mixture. For typical pigments used for ink-let inks the target value of the D50 is 125 nm or less, preferably less than 100 nm. Also the D95 and the particles smaller than 204 nm can be used as a test criteria for the pigment dispersions.

A wide variety of organic and inorganic pigments, alone or in combination, may be selected for dispersion by this process. The dispersed pigment may be used in paints, inks and especially inkjet inks. The term "pigment" as used herein means an insoluble colorant and in the present application includes disperse dyes. The pigment particles are sufficiently small to permit free flow of the ink through the inkjet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss.

The dispersed pigment may be purified after the dispersion process by filtration, ultrafiltration or other processes used for purification of dispersed pigments.

Crosslinked Polymeric Dispersant

The polymeric dispersant may be crosslinked after the pigment dispersion is prepared prior to its inclusion in the inkjet ink.

For crosslinking the polymeric dispersant is substituted with crosslinkable moieties which are selected from the group consisting of acetoacetoxy, acid, amine, epoxy, hydroxyl, blocked isocyanates and mixtures thereof. Then a crosslinking agent is added and the crosslinking of the polymeric dispersant occurs. The crosslinking agent is selected from a group consisting of acetoacetoxy, acid, amine, anhydride, epoxy, hydroxyl, isocyanates, blocked isocyanates and mixtures thereof. The crosslinking of the polymeric dispersant is done after the pigment is dispersed. After the crosslinking step excess polymer can be removed by purification processes such as ultrafiltration.

Specific examples of crosslinking moiety/agent pairs are hydroxyl/isocyanate and acid/epoxy.

Polymeric Binder

A binder is a polymeric compound or a mixture of polymeric compounds that can be optionally added to the ink formulation. The binder can impart properties to the final printed material that, for example, gives greater durability to the printed material. Typical polymers used as binders in inkjet inks include polyurethane dispersions and polyurethane solutions, acrylics, styrene acrylics, styrene butadienes, styrene butadiene acrylonitriles, neoprenes, ethylene acrylic acids, ethylene vinyl acetate emulsions, latexes and the like. The binder may be a solution or stabilized as an emulsion by having ionic substituents such as carboxylic acids, sulfur containing acids, amine groups, and other similar ionic groups.

The binder can be used singly or in combination with other binders. Typically, the binder is a polyurethane. An optional polyurethane binder is one that has a modest amount of crosslinking which when used in an inkjet ink enhances the durability of the printed image.

The binder is typically present in an ink in an amount of at least 0.2% by weight based on the total weight of the ink. The amount can be from 1 to 10 weight percent.

Aqueous Vehicle

The vehicle is a carrier for the colorant. An "aqueous vehicle" refers to a vehicle comprised of water, the 1-alkyl-2-pyrrlidone and an optional additional, water-soluble organic solvent. Selection of a suitable mixture depends on requirements of the specific application, such as desired surface tension and viscosity, the selected colorant, and compatibility with substrate onto which the ink will be printed.

Examples of water-soluble organic solvents include alcohols, ketones, keto-alcohols, ethers and others, such as thiodiglycol, sulfolane, 1,3-dimethyl-2-imidazolidinone, and caprolactam; glycols such as ethylene glycol, diethylene glycol, triethylene glycol, tetraethylene glycol, propylene glycol, dipropylene glycol, tripropylene trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether.

An aqueous vehicle will typically contain 30 wt % to 95 wt % (based on the weight of the aqueous vehicle) water.

Additives

Other ingredients (additives) may be formulated into the inkjet ink, to the extent that such other ingredients do not interfere with the stability and jettability of the finished ink, which may be readily determined by routine experimentation. Such other ingredients are in a general sense well known in the art.

In addition to the anionic surfactant described above additional nonionic surfactants may be added to the ink to adjust surface tension and wetting properties. Suitable additional surfactants include ethoxylated acetylene diols (e.g. Surfynols® series from Air Products), ethoxylated primary (e.g. Tomadol® series from Tomah Products) and secondary (e.g. Tergitol® series from Union Carbide) alcohols. The additional nonionic surfactants are typically used in the amount of from about 0.01 wt % to about 5 wt %, and preferably from about 0.2 wt % to about 3 wt %, based on the total weight of the ink.

Biocides may be used to inhibit growth of microorganisms. Buffers may be used to maintain pH. Buffers include, for example, tris(hydroxymethyl)-aminomethane ("Trizma" or "Tris").

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Proportions of Ingredients

The components described above can be combined to make an ink in various proportions and combinations in order to achieve desired ink properties, as generally described above, and as generally recognized by those of ordinary skill in the art. Some experimentation may be necessary to optimize inks for a particular end use, but such optimization is generally within the ordinary skill in the art.

The amount of vehicle in an ink is typically in the range of from about 70 wt % to about 99.4 wt %, and more typically from about 80 wt % to about 99 wt %. The pigments are generally present in amounts up to 15 wt %, more typically from 0.5 wt % to about 12 wt %, and optionally from 3 wt % to 10 wt %. The polymeric binders are generally present in amounts of 1 to 10 wt %, Percentages are weight percent of the total weight of ink.

Ink Properties

Drop velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as 30 cP at 25° C., but is typically somewhat lower. The ink has physical properties are adjusted to the ejecting conditions and printhead design. The inks should have excellent storage stability for long periods so as not clog to a significant extent in an ink jet apparatus. Further, the ink should not corrode parts of the ink jet printing device it comes in contact with, and it should be essentially odorless and non-toxic.

Ink Set

The term "ink set" refers to all the individual inks or other fluids an inkjet printer is equipped to jet.

The ink sets in accordance with the present disclosure preferably comprise at least three differently colored inks (such as CMY), or at least four differently colored inks (such as CMYK), wherein at least one of the inks is an aqueous inkjet ink as described above.

The other inks of the ink set are preferably also aqueous inks, and may contain dyes, pigments or combinations thereof as the colorant. Such other inks are, in a general sense, well known to those of ordinary skill in the art.

Preferably all of the inks in the inkjet ink set are inkjet inks in accordance with the present disclosure as described above.

In addition to one or more of the typical CMYK colors, the ink sets in accordance with the present disclosure may further comprise one or more "gamut-expanding" inks, including different colored inks such as an orange ink, a green ink, a violet ink, a red ink and/or a blue ink, and combinations of full strength and light strengths inks such as light cyan and light magenta.

EXAMPLES

Polyurethane Dispersant 1

DEA Terminated TMXDI/UH-50/DMPA

To a dry, alkali- and acid-free, 2 liter flask equipped with an additional funnel, a condenser and a stirrer, under a nitrogen atmosphere was added Eternacoll® UH-50 (117.0 g), dimethylol propionic acid (87.0 g) and Sulfolane (220.0 g). The contents were heated to 115° C. and mixed under a nitrogen gas purge for 30 minutes. The temperature was then lowered to 60° C. and DBTDL (0.08 g) was added followed by TMXDI (238.0 g) via the addition funnel. The residual TMXDI in the additional funnel was rinsed into the flask with Sulfolane (15.0 g). The stirred reaction mass was allowed to exotherm. When exotherm began to slow, the temperature was maintained at 100° C. while monitoring the isocyanate content until it reached 1.06%. The temperature was lowered to 60° C. To the flask was added DEA (18.04 g) via the additional funnel followed by rinsing the residual BMEA in additional funnel into the flask with Sulfolane (5.0 g). The mixture was maintained at 60° C. for 90 minutes. A solution of 45% KOH in water (56.56 g) and additional de-ionized water (776.87 g) were added over a period of 5 minutes to give a 70% neutralized polyurethane resin in water. This was allowed to stir and cool to room temperature to provide a polyurethane dispersion with 27.49% of solids and a measured acid number of 79.03 mg KOH/gram polymer.

Preparation of Black Pigmented Dispersion

The following procedure was used to prepare a black pigmented dispersion using Nipex 180 and Polyurethane Dispersant. Using a microfluidizer, a premix was prepared at typically 20-30% pigment loading and the targeted dispersant level was selected at a pigment/dispersant (P/D) ratio of 2.0. A P/D of 2.0 corresponds to a 40% dispersant level on pigment. A co-dispersant, Surfynol® 104 in Dowanol™ DPM at a P/D=100 was added to the total dispersion formulation to facilitate wetting of pigment and dissolution of dispersant in the premix stage for ease of grinding during milling stage. Dispersant 1 was pre-neutralized with KOH to facilitate solubility and dissolution into water. An additional 6.91 g of a 45% KOH solution in water was added. During the premix stage and milling stage, de-ionized water (1200 g) was added to adjust viscosity and control temperature. After completion of the milling stage, the remaining letdown of de-ionized water (450.0 g) was added and thoroughly mixed. The crude pigment dispersion contains 23.15% of solids.

The crude pigment dispersion was purified using an ultrafiltration process to remove co-solvent(s) and excess dispersant, and filter out other impurities that may be present. After completion, the pigment level in the dispersion was reduced to 10 to 15%. Two single black dispersions were prepared using Polyurethane Dispersant 1. One with a P/D value of 2.0 as described above and another one using a similar procedure but with a P/D value of 3.0.

| Pigmented Dispersion | Pigment | Pigment/ Dispersant | Polyurethane Dispersant No. | Particle Size | |
|---|---|---|---|---|---|
| | | | | D50 (nm) | D95 (nm) |
| K1 | Nipex 180 | 2 | 1 | 107 | 185 |
| K2 | Nipex 180 | 3 | 1 | — | — |

Preparation of Cross-Linked Pigment Dispersions XL-K1 and XL-K2

In the cross-linking step, Denacol® 321 was separately mixed with Pigmented Dispersions K1 and K2, and heated at temperatures between 60° C. and 80° C. with efficient stirring for 6-8 hours. After the cross-linking reaction was completed, the pH was adjusted to at least about 8.0 if needed. The compositions of the cross-linked Pigment Dispersions XL-K1 and XL-K2 are summarized below.

| Cross-linked Dispersion | Pigmented Dispersion | Cross-linkable Moiety | Cross-linking Compound |
|---|---|---|---|
| XL-K1 | K1 | COOH, OH | Denacol ® 321 |
| XL-K2 | K2 | COOH, OH | Denacol ® 321 |

Preparation of Cyan Pigmented Dispersion

The following procedure was used to prepare a cyan pigmented dispersion using Pigment Blue 15:3 and Polyurethane Dispersant. Using a media mill, a premix was prepared at typically 20-30% pigment loading and the targeted dispersant level was selected at a pigment/dispersant (P/D) ratio of 3.0. A P/D of 3.0 corresponds to a 33.33% dispersant level on pigment. A co-dispersant, Surfynol® 104 in Dowanol™ DPM at a P/D=100 was added to the total dispersion formulation to facilitate wetting of pigment and dissolution of dispersant in the premix stage for ease of grinding during milling stage. Dispersant 1 was pre-neutralized with KOH to facilitate solubility and dissolution into water. An additional 6.91 g of a 45% KOH solution in water was added. During the premix stage and milling stage, de-ionized water (1200 g) was added to adjust viscosity and control temperature. After completion of the milling stage, the remaining letdown of de-ionized water (450.0 g) was added and thoroughly mixed. The final pigment dispersion contains 23.15% of solids.

The pigment dispersion was purified using an ultrafiltration process to remove co-solvent(s) and excess dispersant, and filter out other impurities that may be present. After completion, the pigment level in the dispersion was reduced to 10 to 15%. A single cyan dispersion was prepared using the Polyurethane Dispersant 1.

| Pigmented Dispersion | Pigment | Pigment/ Dispersant | Polyurethane Dispersant No. | Particle Size D50 (nm) | D95 (nm) |
|---|---|---|---|---|---|
| C1 | PB 15:3 | 3 | 1 | 80 | 140 |

Preparation of Cross-Linked Pigment Dispersion XL-C1

In the cross-linking step, Denacol® 321 was mixed with Pigmented Dispersion C1, and heated at temperatures between 60° C. and 80° C. with efficient stirring for 6-8 hours. After the cross-linking reaction was completed, the pH was adjusted to at least about 8.0 if needed. The composition of the cross-linked Pigment Dispersion XL-C1 is summarized below.

| Cross-linked Dispersion | Pigmented Dispersion | Cross-linkable Moiety | Cross-linking Compound |
|---|---|---|---|
| XL-C1 | C1 | COOH, OH | Denacol ® 321 |

The Magenta and Yellow pigment dispersions were prepared using similar processes. The Magenta pigment is Pigment Red 122 and is designated as XL-M1. Yellow pigment is Pigment Yellow 74 and is designated as XL-Y1.

Example 1

Black Pigment Dispersion with Tricine

Various amounts of tricine by weight, based on the total weight of the dispersion, were added to black Pigment Dispersions XL-K1 and XL-K2. The conductivity and viscosity of the resulting dispersions are listed in Table 1 below. As shown in Table 1, addition of tricine resulted in decreases in viscosity for the resulting dispersions which allows for significant formulation flexibility for use in inkjet inks.

TABLE 1

| Dispersion | P/D* | wt % tricine | Conductivity | Viscosity |
|---|---|---|---|---|
| XL-K1 | 2 | 0 | 0.87 | 5.4 |
| XL-K1 | 2 | 0.25 | 1.22 | 3.8 |
| XL-K1 | 2 | 0.5 | 1.3 | 3.4 |
| XL-K2 | 3 | 0 | 0.74 | 5.9 |
| XL-K2 | 3 | 0.25 | 1.06 | 3.9 |
| XL-K2 | 3 | 0.5 | 1.12 | 3.7 |

*Note: P/D denotes pigment/dispersant weight ratio

Preparation of Inks

A cyan ink, a yellow ink and a magenta ink were prepared according to the ingredients listed in Table 2 below, where the amounts are weight percent based on the total weight of ink. In general, the ink components may be added in any order of convenience. Ingredients were mixed together and filtered. Water was deionized.

TABLE 2

| Ingredients | Cyan Ink | Yellow ink | Magenta Ink |
|---|---|---|---|
| Cyan Dispersion XL-C1 | 41.10% | — | — |
| Yellow Dispersion XL-Y1 | — | 38.20% | — |
| Magenta Dispersion XL-M1 | — | — | 37.70% |
| 1,2-Hexandiol | 2.0% | 2.0% | 2.0% |
| 1,2-Propandiol | 5.0% | 5.0% | 5.0% |
| Glycerol | 24.0% | 28.0% | 21.2% |
| TEB | 3.0% | 3.0% | 3.0% |
| 2-Pyrrolidone/H20 | 3.0% | 3.0% | 3.0% |
| Surfynol 465 | 0.75% | 0.75% | 0.75% |
| Proxel | 0.15% | 0.15% | 0.15% |
| Tricine | 0.25% | 0.25% | 0.25% |
| D.I. Water | Balance to 100% | | |

The physical properties of the inks are listed in Table 3 below.

TABLE 3

| Physical Properties | Cyan Ink | Yellow Ink | Magenta Ink |
|---|---|---|---|
| Viscosity 25° C. (cp) | 5.6 | 5.94 | 5.25 |
| pH | 8.13 | 7.92 | 7.86 |
| Conductivity (mS/cm) | 0.38 | 0.27 | 0.3 |
| Surface Tension (mN/m) | 33.95 | 33.69 | 33.14 |
| Particle Size D50 (nm) | 76.5 | 65.9 | 98.8 |
| D90 (nm) | 127.5 | 113.7 | 180 |
| D95 (nm) | 147.7 | 134.6 | 212.8 |

The cyan, magenta and yellow inks were found to be stable in that key physical properties were not significantly changed over the course of storage at 60° C. for two weeks. Table 4 shows the pH data for inks stored under room temperature (designated as Shelf) and under accelerated aging conditions (oven aging). The pH parameter is a marker for stability. As shown in Table 4, the cyan, yellow and magenta inks containing hydroxyl-substituted amino acids were stable during long term storage as well as oven aging.

TABLE 4

| pH | Cyan Ink | Yellow Ink | Magenta Ink |
|---|---|---|---|
| Initial pH | 8.48 | 8.48 | 8.43 |
| 3 day Shelf | 8.25 | 8.23 | 8.2 |
| 3 day 70° C. Oven | 8.27 | 8.23 | 8.15 |
| 7 day Shelf | 8.35 | 8.28 | 8.24 |
| 7 day 70° C. Oven | 8.35 | 8.34 | 8.25 |

The invention claimed is:

1. An aqueous pigment dispersion comprising a colorant and a hydroxyl-substituted amino acid or salt thereof as a viscosity modifier, wherein said colorant is dispersed with a polyurethane dispersant, and said hydroxyl-subestituted amino acid has a structure of Formula I,

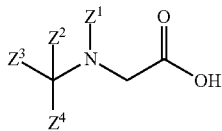

(I)

$Z^1$ is H or $(CH_2)_k OH$; k is 1-6;
$Z^2$ is $(CH_2)_m OH$; m is 1-5;
$Z^3$ is H or $(CH_2)_n OH$; n is 1-5;
$Z^4$ is H or $(CH_2)_p OH$; p is 1-5; and
wherein there are at least two hydroxyl alkyl substitutents on said amino acid.

2. The aqueous pigment dispersion of claim 1, wherein the amount of the hydroxy-substituted amino acid is 0.01 to 2.0 weight percent of the aqueous pigment dispersion.

3. The aqueous pigment dispersion of claim 1, wherein the amount of the hydroxyl-substituted amino acid is 0.02 to 1.0 weight percent of the aqueous pigment dispersion.

4. The aqueous pigment dispersion of claim 1, wherein said hydroxyl-substituted amino acid is bicine which corresponds to Structure (I), wherein $Z^1$ is $(CH_2)_2 OH$, $Z^2$ is $(CH_2)OH$, and $Z^3$ and $Z^4$ are H.

5. The aqueous pigment dispersion of claim 1, wherein said hydroxyl-substituted amino acid is tricine which corresponds to Structure (I), wherein $Z^1$ is H, and $Z^2$, $Z^3$ and $Z^4$ are $(CH_2)OH$.

6. The aqueous pigment dispersion of claim 1, wherein the colorant is selected from the group consisting of pigments, disperse dyes and mixtures thereof.

7. The aqueous pigment dispersion of claim 1, wherein the amount of the colorant is from 5 to 30 weight percent of said aqueous pigment dispersion.

8. The aqueous pigment dispersion of claim 1 having a viscosity of less than the viscosity of a similar aqueous pigment dispersion without any hydroxyl-substituted amino acid.

9. The aqueous pigment dispersion of claim 1, wherein the pH of said aqueous pigment dispersion is from 6 to 9.

10. An inkjet ink comprising an aqueous vehicle, an aqueous pigment dispersion comprising a colorant and a hydroxyl-substituted amino acid or salt thereof as a viscosity modifier; wherein said colorant is dispersed with a polyurethane dispersant, and said hydroxy-substituted amino acid has a structure of Formula I,

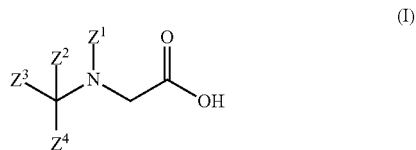

(I)

$Z^1$ is H or $(CH_2)_k OH$; k is 1-6;
$Z^2$ is $(CH_2)_m OH$; m is 1-5;
$Z^3$ is H or $(CH_2)_n OH$; n is 1-5;
$Z^4$ is H or $(CH_2)_p OH$; p is 1-5; and
wherein there are at least two hydroxyl alkyl substitutents on said amino acid.

11. The inkjet ink of claim 10, wherein said polyurethane dispersant is substituted with crosslinkable moieties selected from the group consisting of acetoacetoxy, acid, amine, epoxy, hydroxyl, blocked isocyanates and mixtures thereof.

12. The inkjet ink of claim 11, wherein said polyurethane dispersant substituted with crosslinkable moieties is reacted with a crosslinking agent selected from the group consisting of acetoacetoxy, acid, amine, anhydride, epoxy, hydroxyl, isocyanates, blocked isocyanates and mixtures thereof.

13. The inkjet ink of claim 10, wherein said hydroxyl-substituted amino acid is bicine which corresponds to Structure (I), wherein $Z^1$ is $(CH_2)_2 OH$, $Z^2$ is $(CH_2)OH$, and $Z^3$ and $Z^4$ are H.

14. The inkjet ink of claim 10, wherein said hydroxyl-substituted amino acid is tricine which corresponds to Structure (I), wherein $Z^1$ is H, and $Z^2$, $Z^3$ and $Z^4$ are $(CH_2)OH$.

15. The inkjet ink of claim 10, wherein said colorant is selected from the group consisting of pigments, disperse dyes and mixtures thereof.

16. An inkjet ink set comprising at least three differently colored inks, at least one of which is an ink as set forth in claim 10.

17. The inkjet ink set of claim 16, wherein the ink set comprises at least three differently colored inks, at least one of which is a yellow ink, at least one of which is a magenta ink, and at least one of which is a cyan ink.

18. The inkjet ink set of claim 17, further comprising a black ink.

19. The aqueous pigment dispersion of claim 1, wherein said polyurethane dispersant is crosslinked.

20. The inkjet ink of claim 10, wherein said polyurethane dispersant is crosslinked.

* * * * *